United States Patent
Park et al.

(10) Patent No.: US 7,531,950 B2
(45) Date of Patent: May 12, 2009

(54) FIELD EMISSION DEVICE AND ITS METHOD OF FABRICATION

(75) Inventors: Young-Jun Park, Suwon-si (KR); Tae-Won Jeong, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 365 days.

(21) Appl. No.: 11/488,680

(22) Filed: Jul. 19, 2006

(65) Prior Publication Data
US 2007/0029912 A1  Feb. 8, 2007

(30) Foreign Application Priority Data
Aug. 8, 2005  (KR) ............... 10-2005-0072333

(51) Int. Cl.
*H01J 9/02*  (2006.01)
*H01J 19/24*  (2006.01)

(52) U.S. Cl. ................ 313/310; 313/306; 313/311; 313/497; 445/23; 445/42; 445/51; 445/56

(58) Field of Classification Search ............... None
See application file for complete search history.

(56) References Cited

U.S. PATENT DOCUMENTS

| | | | | |
|---|---|---|---|---|
| 5,614,353 A | * | 3/1997 | Kumar et al. | 430/313 |
| 5,984,752 A | * | 11/1999 | Tanaka et al. | 445/51 |
| 2007/0024180 A1 | * | 2/2007 | Choi et al. | 313/498 |

* cited by examiner

*Primary Examiner*—Ashok Patel
(74) *Attorney, Agent, or Firm*—Robert E. Bushnell, Esq.

(57) ABSTRACT

A field emission device has an improved structure in which electron emission from a cathode is enhanced through external light radiation. The field emission device includes: a light transmitting substrate; a cathode unit arranged on the light transmitting substrate and adapted to emit electrons, the cathode unit including: a first electrode layer of a transparent conductive material arranged on the substrate; a first electron emission layer of a semiconductive polymer organic material arranged on the first electrode layer; a second electron emission layer of a composite of a carbon-based inorganic material and a semiconductive polymer organic material arranged on the first electron emission layer; and a second electrode layer of a conductive material arranged on the second electron emission layer. The field emission device further includes an anode arranged to face the cathode unit.

21 Claims, 7 Drawing Sheets

FIELD EMISSION DEVICE AND ITS METHOD OF FABRICATION

CLAIM OF PRIORITY

This application makes reference to, incorporates the same herein, and claims all benefits accruing under 35 U.S.C. §119 from an application for FIELD EMISSION DEVICE AND FABRICATION METHOD OF THE SAME earlier filed in the Korean Intellectual Property Office on the $8^{th}$ of Aug. 2005 and there duly assigned Serial No. 10-2005-0072333.

BACKGROUND OF THE INVENTION

1. Field of the Invention

The present invention relates to a field emission device, and more in particular, to a field emission device with an improved structure in which the electron emission is improved through light radiation from the outside and, a method of fabricating the field emission device.

2. Description of the Related Art

Display apparatus, which are a main component of conventional information transfer mediums, are mainly applied to monitors of personal computers and televisions. Display apparatus can be classified into Cathode Ray Tubes (CRTS) and flat panel displays, which have recently been developing rapidly. Liquid Crystal Displays (LCDs), Plasma Display Panels (PDPs), and Field Emission Displays (FEDs) are examples of flat panel displays.

In FEDs, a strong electric field is applied to an electron emission source which is separated a predetermined distance from a cathode electrode, and thus electrons are emitted from the electron emission source and collide with a fluorescent material of an anode electrode, and thus emit light. Examples of electron emission sources include microchips made of metal such as molybdenum (Mo), although, mainly Carbon NanoTubes (CNTs) are used now. Field emission devices using CNTs have a broad viewing angle, high resolution, low power consumption, and temperature stability, and thus can be used in various fields such as viewfinders of car navigation systems and electronic image devices. Moreover, field emission devices using CNTs are used in personal computers, Personal Data Assistant (PDA) terminals, medical appliances, and High Definition TeleVisions (HDTVs).

To obtain displays with large screens and low power consumption, a new technique to improve the structure of field emission devices while enhancing the field emission characteristic using lower power is needed.

SUMMARY OF THE INVENTION

The present invention provides a field emission device with an improved structure in which electron emission from a cathode is enhanced through light radiation from the outside, and a method of fabricating the field emission device.

According to one aspect of the present invention, a field emission device is provided including: a light transmitting substrate; a cathode unit arranged on the light transmitting substrate and adapted to emit electrons, the cathode unit including: a first electrode layer of a transparent conductive material arranged on the substrate; a first electron emission layer of a semiconductive polymer organic material arranged on the first electrode layer; a second electron emission layer of a composite of a carbon-based inorganic material and a semiconductive polymer organic material arranged on the first electron emission layer; and a second electrode layer of a conductive material arranged on the second electron emission layer; the field emission device further includes an anode arranged to face the cathode unit.

The carbon-based inorganic material is preferably selected from the group consisting of $C_{60}$, $C_{70}$, $C_{76}$, $C_{78}$, $C_{84}$, and carbon nanotubes (CNTs).

The semiconductive polymer organic material is preferably selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

The second electron emission layer preferably includes 0.5 wt % of a carbon-based inorganic material and 99.5 wt % of a semiconductive polymer organic material.

The field emission device preferably further includes an external light source arranged on a rear surface of the light transmitting substrate and adapted to emit light with a wavelength in a range of 400 nm to 900 nm onto the first and second emission layers.

According to another aspect of the present invention, a field emission device is provided including: a light transmitting rear substrate; a light transmitting front substrate arranged to face the light transmitting rear substrate; a cathode unit arranged on a surface of the rear substrate and adapted to emit electrons, the cathode unit including: a first electrode layer of a transparent conductive material arranged on the substrate; a first electron emission layer of a semiconductive polymer organic material arranged on the first electrode layer; a second electron emission layer of a composite of a carbon-based inorganic material and a semiconductive polymer organic material arranged on the first electron emission layer; and a second electrode layer of a conductive material arranged on the second electron emission layer; the field emission device further includes: an anode arranged on a surface of the front substrate to face the cathode unit; and a phosphor layer arranged on the anode.

The carbon-based inorganic material is preferably selected from the group consisting of $C_{60}$, $C_{70}$, $C_{76}$, $C_{78}$, $C_{84}$, and carbon nanotubes (CNT).

The semiconductive polymer organic material is preferably selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

The second electron emission layer preferably includes 0.5 wt % of a carbon-based inorganic material and 99.5 wt % of a semiconductive polymer organic material.

The field emission display preferably further includes an external light source arranged on a rear surface of the light transmitting rear substrate and adapted to emit light with a wavelength in a range of 400 nm to 900 nm onto the first and second emission layers.

According to still another aspect of the present invention, a method of manufacturing a field emission device is provided, the method including: providing a light transmitting substrate; forming a cathode unit on a surface of the substrate, the cathode unit adapted to emit electrons; and forming an anode facing the cathode unit such that the electrons are incident on the anode; forming the cathode unit includes: forming a first electrode layer of a transparent conductive material on the light transmitting substrate; forming a first electron emission layer of a semiconductive polymer organic material on the first electrode layer; forming a second electron emission layer of a semiconductive polymer material and a carbon-based inorganic material layer on the first electron emission layer;

and forming a second electrode layer of a conductive material on the second electron emission layer.

The carbon-based inorganic material is preferably selected from the group consisting of $C_{60}$, $C_{70}$, $C_{76}$, $C_{78}$, $C_{84}$, and carbon nanotubes (CNTs).

The semiconductive polymer organic material is preferably selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

The second electron emission layer preferably includes 0.5 wt % of a carbon-based inorganic material and 99.5 wt % of a semiconductive polymer organic material.

The method preferably further includes providing an external light source arranged on a rear surface of the light transmitting substrate and adapted to emit light with a wavelength in a range of 400 nm to 900 nm onto the first and second emission layers.

Forming the first electron emission layer preferably includes: forming a semiconductive polymer organic liquid by dissolving a semiconductive polymer organic material in chloroform ($CHCl_3$); coating the semiconductive polymer organic liquid on the first electrode layer; and baking the semiconductive polymer organic coating layer.

The semiconductive polymer organic liquid is preferably coated using one of a spin coating method, a spray coating method, a dip coating method, or a screen printing method.

The baking process is preferably conducted at a temperature of 120° C. for one hour.

Forming the second electron emission layer preferably includes: forming a semiconductive polymer organic liquid by dissolving a semiconductive polymer organic material in chloroform ($CHCl_3$); forming a mixed liquid by mixing the semiconductive polymer organic liquid with the carbon-based inorganic material; coating the mixed liquid on the first electron emission layer; and baking the mixed coating layer.

The mixed liquid is preferably coated using one of a spin coating method, a spray coating method, a dip coating method, or a screen printing method.

The baking process is preferably conducted at a temperature of 120° C. for one hour.

According to the present invention, a field emission device with an improved structure is provided in which electron emission from the cathode is enhanced by external light radiation.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully below with reference to the accompanying drawings, in which exemplary embodiments of the invention are shown. In the drawings, the thicknesses of layers and regions have been exaggerated for clarity.

Figure 1:
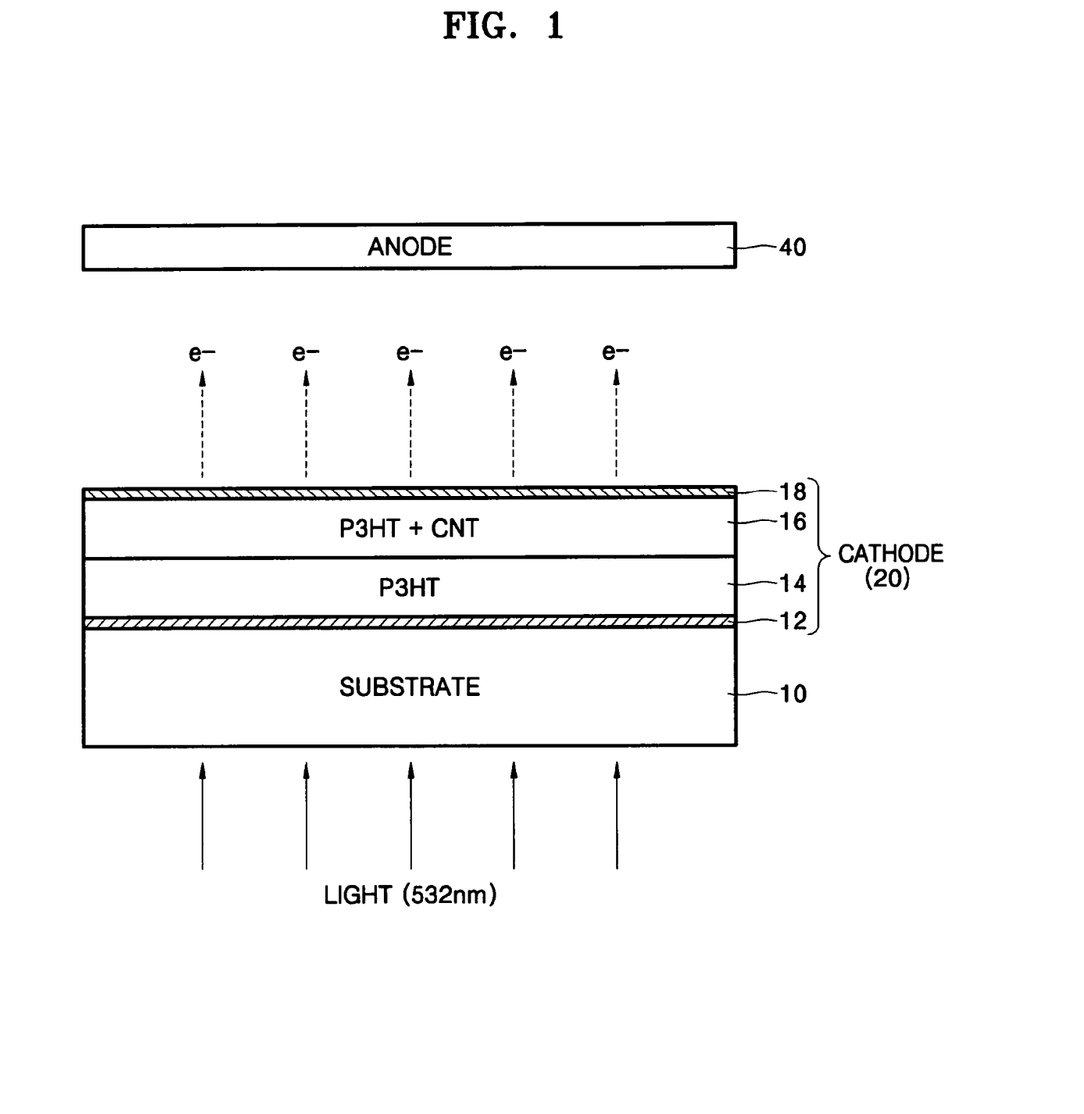
FIG. 1 is a schematic cross-sectional view of a field emission device according to an embodiment of the present invention.

FIG. 1 is a schematic cross-sectional view of a field emission device according to an embodiment of the present invention. Referring to FIG. 1, the field emission device according to the present embodiment includes a light transmitting substrate 10, a cathode unit 20 formed on a surface of the light transmitting substrate 10 to emit electrons and an anode 40 facing the cathode unit 20.

In the present embodiment, the cathode unit 20 includes a first electrode layer 12, a second electron emission layer 14 made of a composite of a carbon-based inorganic material and a semiconductive polymer organic material formed on the first electrode layer 12, a second electron emission layer 16 made of a conductive material and formed on the second electron emission layer 14, and a second electrode layer 18 made of a conductive material and formed on the second electron emission layer 16. The carbon-based inorganic material can be selected from the group consisting of $C_{60}$, $C_{70}$, $C_{76}$, $C_{78}$, $C_{84}$, and Carbon Nanotubes (CNTs), and the semiconductive polymer organic material can be selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

The first electrode layer 12 and the second electrode layer 18 are respectively formed of Indium Tin Oxide (ITO) and aluminum (AL), and each has a thickness of 1000 Å. The first and second electrode layers 12 and 18 respectively function as a cathode electrode and a gate electrode. When a predetermined potential difference is applied between the first electrode layer 12 and second electrode layer 18, holes and electrons are generated in the first electron emission layer 14 and the second emission layer 16 interposed therebetween. The holes and electrons respectively move to the first electrode layer 12 and the second electrode layer 18, and the electrons transferred to the second electrode layer 18 can be emitted to the anode 40 due to an electric field between the cathode unit 20 and the anode 40.

Semiconductive polymer materials such as P3HT are excited easily by external light with a wavelength ranging from 400 nm to 900 nm, and thus generate holes and electrons. Accordingly, when the second electron emission layer 14 is made of such a semiconductive polymer material and an external light with a wavelength ranging from 400 nm to 900 nm is radiated on the first electron emission layer 14, the electron emission characteristics of the cathode unit 20 can be enhanced. Furthermore, sunlight can be used as an external light source, and thus low power display can be realized. A light source (not shown) emitting light with a wavelength of 400 nm and 900 nm onto the first and second emission layers 14 and 16 can be further included on a rear surface of the light emitting substrate 10.

The second electron emission layer 16 is formed of a composite of a carbon-based inorganic material and a semiconductive polymer organic material, and the carbon-based inorganic material, such as CNTs, provides a path for the electrons from the semiconductive polymer material to the second electrode layer. The second electron emission layer 16 can include 0.5 wt % of the carbon-based inorganic material and 99.5 wt % of the semiconductive polymer organic material.

In the field emission device, since electron emission layers made of a polymer organic material are used as an electron source, a flexible display with a large surface can be realized. Accordingly, new concepts for display devices such as portable and window-mounted displays corresponding to Plasma Display Panels (PDPs) or Liquid Crystal Displays (LCDs) can be developed in the future based on the present invention.

Figure 2A:
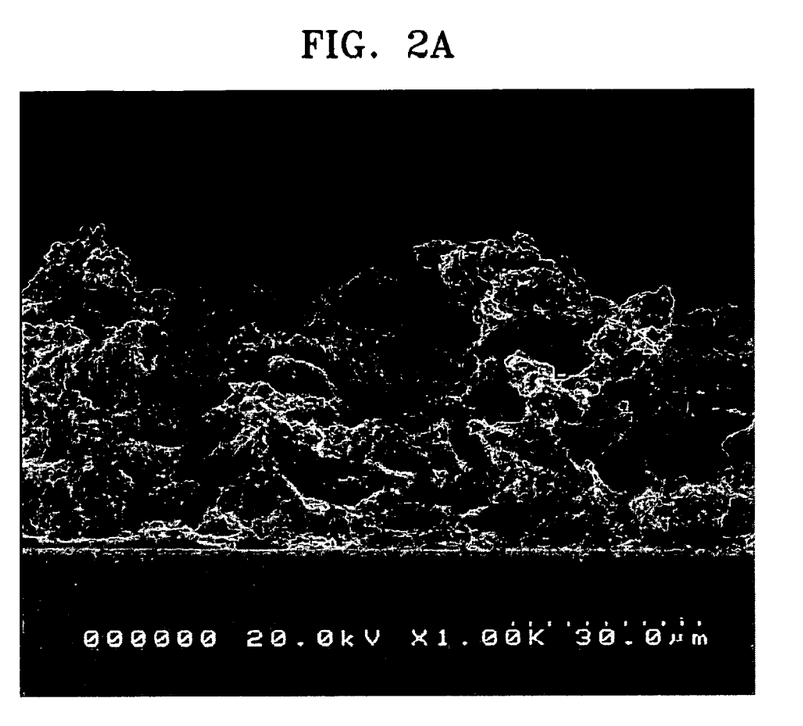
FIG. 2A is a SEM image of a cross-section of a cathode unit of FIG. 1.
Figure 2B:
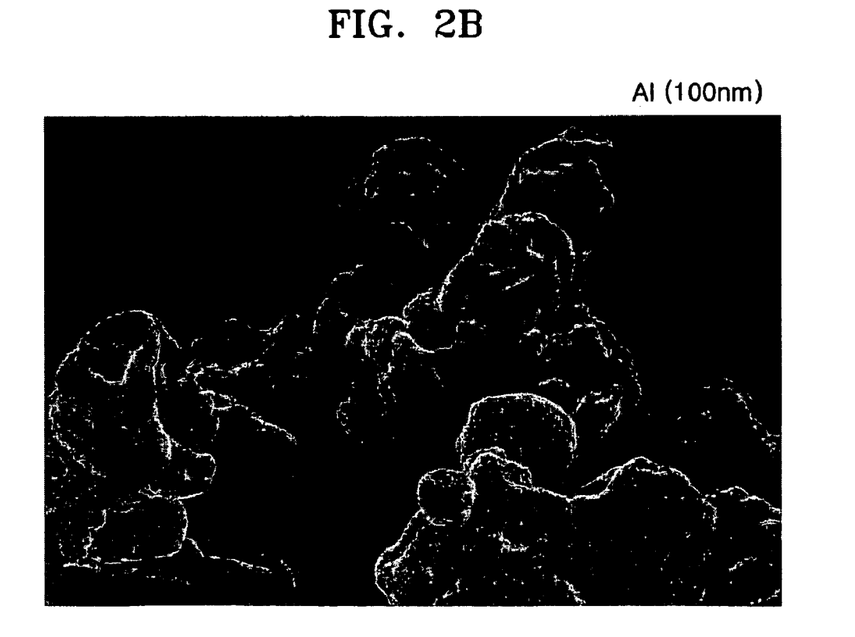
FIGS. 2B through 2D are SEM images of circled parts A, B, and C of FIG. 2A.
Figure 2C:
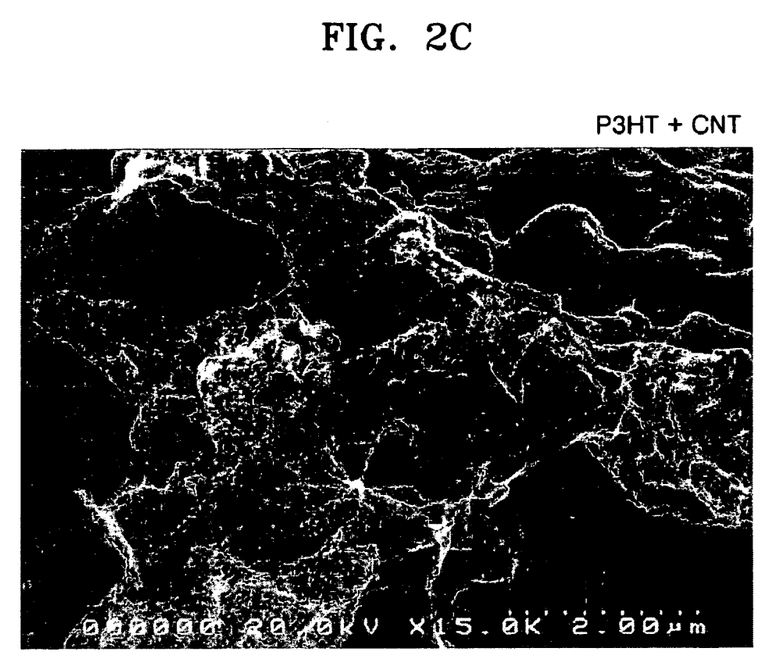
Figure 2D:
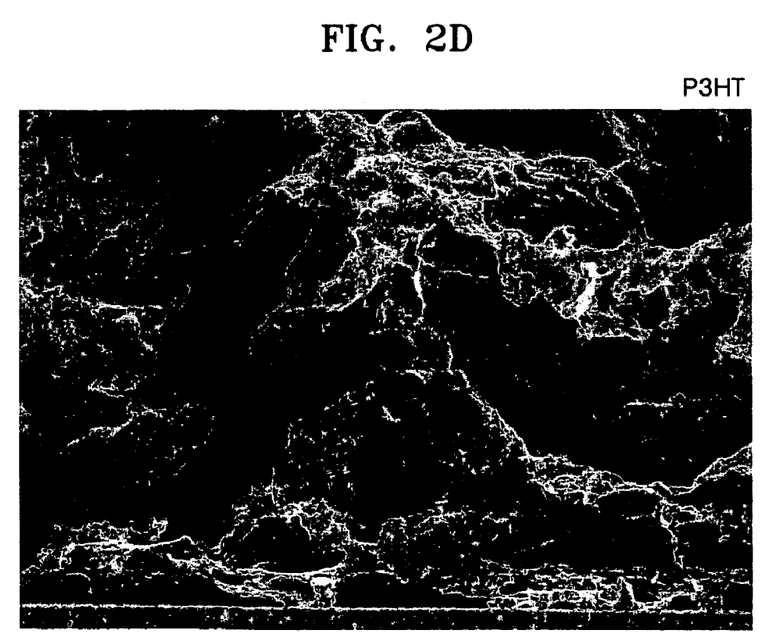

FIG. 2A is a SEM image of a cross-section of a cathode unit of FIG. 1, and FIGS. 2B through 2D are SEM images of circled parts A, B, and C of FIG. 2A. Part A is the second electrode layer formed of Al, part B is the second electron emission layer formed of P3HT and CNTs, and part C is the first electron emission layer formed of P3HT.

Figure 3:
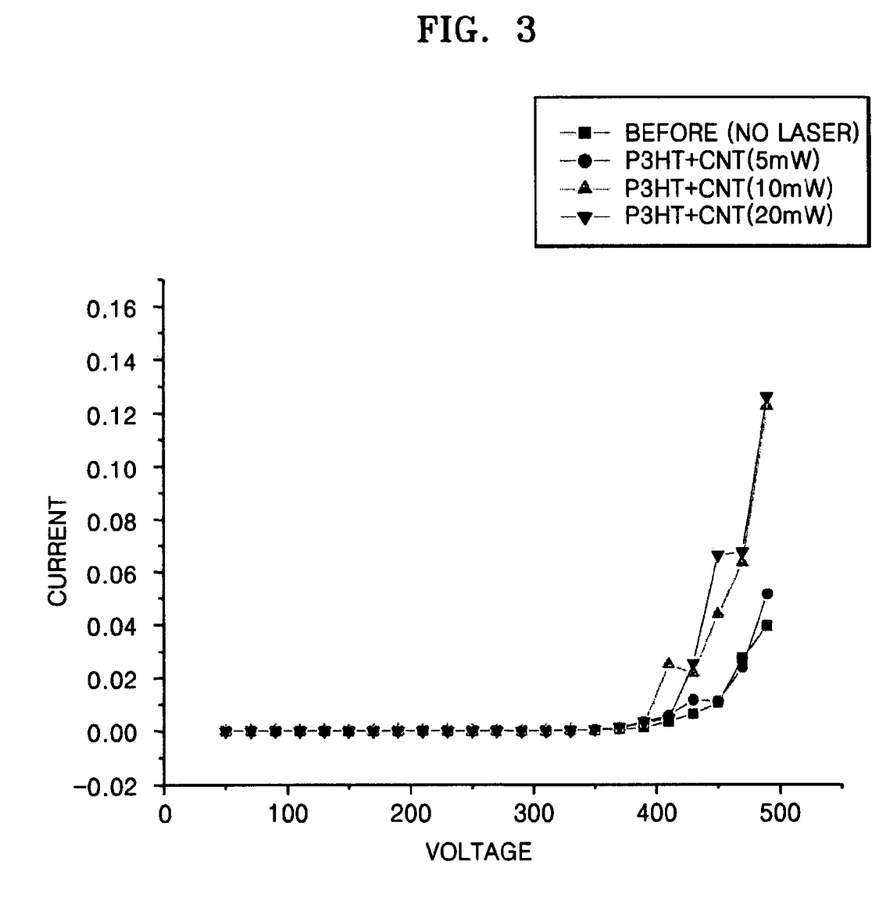
FIG. 3 is an I-V (current-voltage) graph of a second electron emission layer made of a composite of P3HT and carbon nanotubes (CNTs) of FIG. 1.

FIG. 3 is an I-V (current-voltage) graph of the second electron emission layer 16 made of a composite of P3HT and CNTs. In FIG. 3, I-V graphs in the case where a laser beam is not radiated to the second electron emission layer 16 and in the case of a laser beam with a wavelength of 532 nm is radiated on the second electron emission layer 16 with laser powers of 5 mW, 10 nW, and 20 mW are shown.

Figure 4:
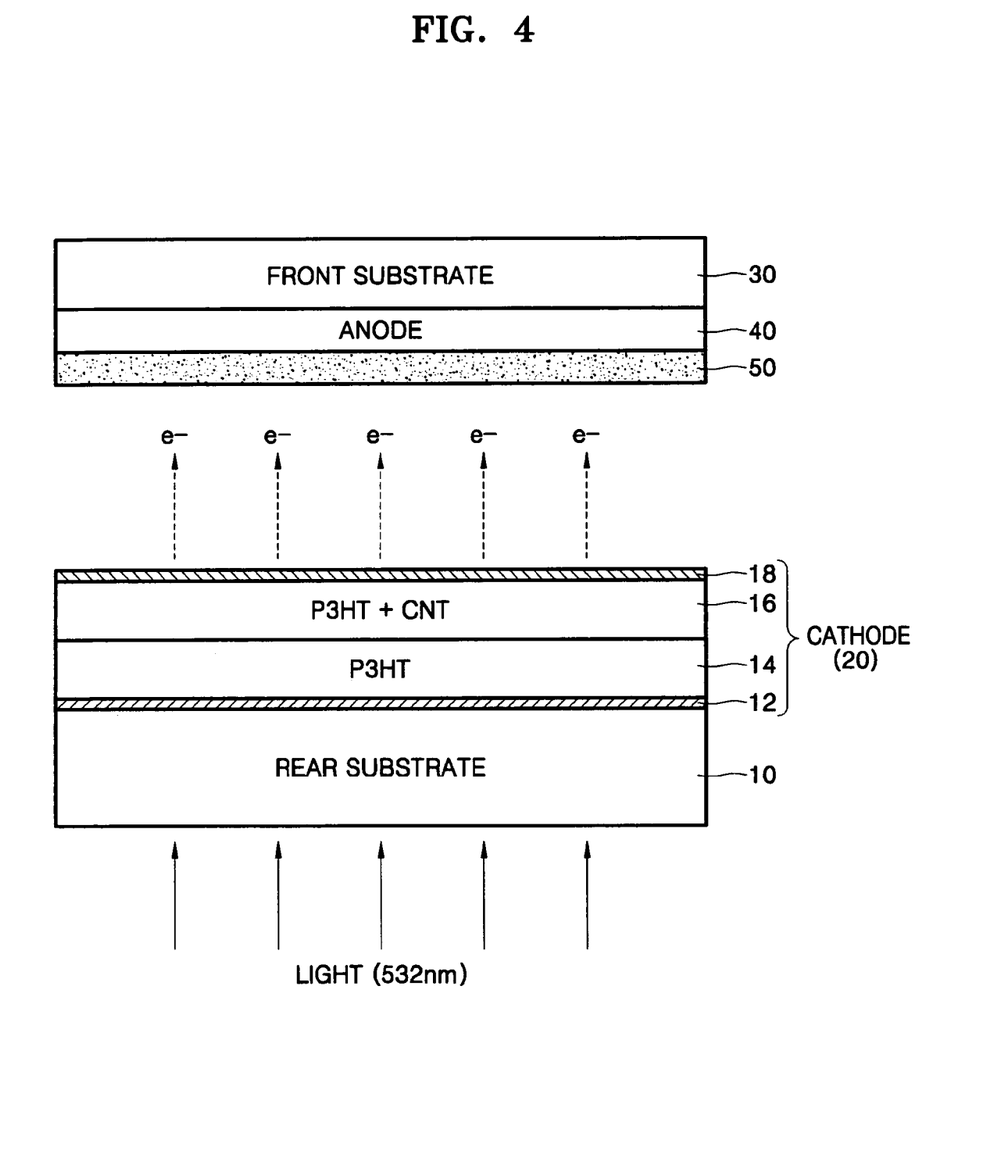
FIG. 4 is a cross-sectional view of a field emission display according to an embodiment of the present invention.

FIG. 4 is a cross-sectional view of a field emission display according to an embodiment of the present invention. Descriptions of the elements common to FIGS. 1 and 4 have not been repeated, and like reference numerals denote like elements.

Referring to FIG. 4, the field emission display device of the present embodiment includes a light transmitting rear substrate 10 and a light transmitting front substrate 30 facing each other, a cathode unit 20 formed on a surface of the rear substrate 10 to emit electrons, an anode 40 facing the cathode unit 20 and formed on a surface of the front substrate 30, and a phosphor layer 50 formed on the anode 40. The rear substrate 10 and the front substrate 30 can be separated from each other by a predetermined distance by barriers (not shown) or spacers (not shown).

As described above, the cathode unit 20 includes a first electrode layer 12 made of a transparent, conductive material formed on the light transmitting rear substrate 10, a first electron emission layer 14 made of a semiconductive polymer organic material formed on the first electrode layer 12, a second electron emission layer 16 made of a composite of a carbon-based inorganic material and a semiconductive polymer organic material formed on the first electron emission layer 14, and a second electrode layer 18 made of a conductive material formed on the second electron emission layer 16. A light source (not shown) emits light with a wavelength of 400 nm and 900 nm onto the first and second emission layers 14 and 16 can be further included on the light emitting rear substrate 10.

When a predetermined potential difference is applied between the first electrode layer 12 and the second electrode layer 18, holes and electrons are generated in the first electron emission layer 14 and the second electron emission layer 16 interposed therebetween. The holes and electrons are respectively transferred to the first electrode layer 12 and the second electrode layer 18. The electrons transferred to the electrode layer 18 can be accelerated from the second electrode layer 18 to the anode 40 by an electric field applied between the cathode unit 20 and the anode 40, and the phosphor layer 50 formed on the anode 40 can be excited by the electrons.

FIGS. 5A through 5E are cross-sectional views of stages of a method of fabricating a field emission device according to an embodiment of the present invention.

Figure 5A:
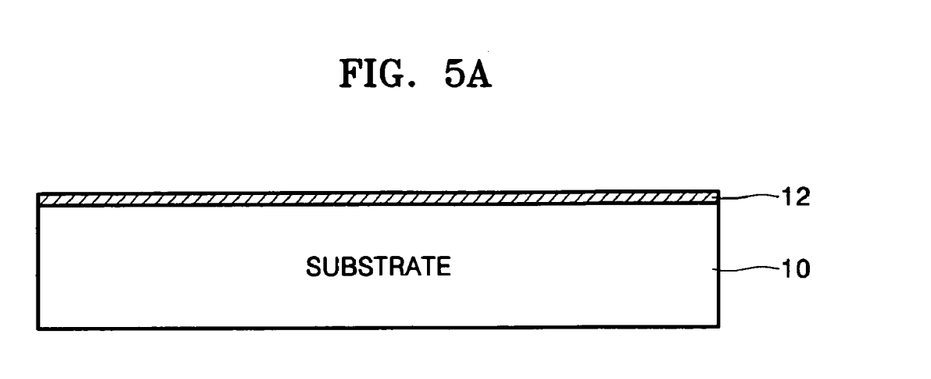
FIGS. 5A through 5E are cross-sectional views of stages of a method of fabricating a field emission device according to an embodiment of the present invention.

Referring to FIG. 5A, a light transmitting substrate 10 is provided, and a first electrode layer 12 formed of a transparent, conductive material, such as ITO, is formed on the light transmitting substrate 10. The first electrode layer 12 can be formed using one of many thin layer deposition methods such as CVD, PVD, a screen printing method, and a spray coating method.

Figure 5B:
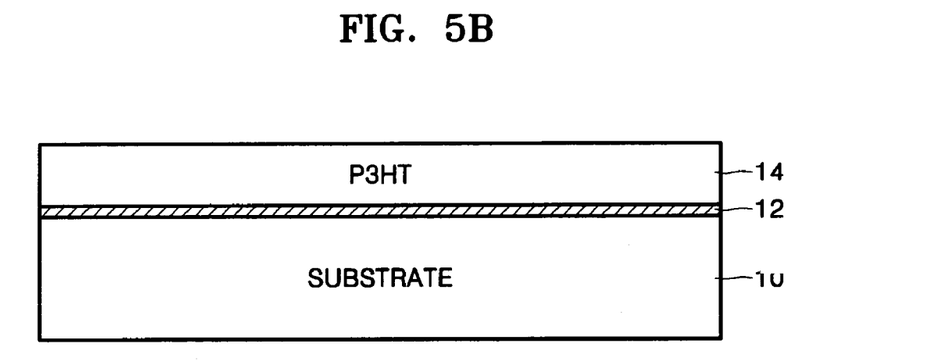

Referring to FIG. 5B, a first electron emission layer 14 is formed on the first electrode layer 12. The first electron emission layer 14 is made of a semiconductive polymer organic material, such as P3HT. The semiconductive polymer organic material can be one material selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

To form the first electron emission layer 14, a semiconductive polymer organic material, such as P3HT, is mixed with chloroform ($CHCl_3$) to obtain a semiconductive polymer organic liquid. For example, P3HT is mixed with chloroform ($CHCl_3$) in a weight ratio of 15:1 to obtain a P3HT liquid. The semiconductive polymer organic liquid is then coated on the first electrode layer 12 using one of a spin coating method, a spray coating method, a deep coating method, or a screen printing method. The semiconductive polymer organic coating layer is then baked at a temperature of 120° C. for one hour. In this manner, the first electron emission layer 14 is formed using P3HT.

Figure 5C:
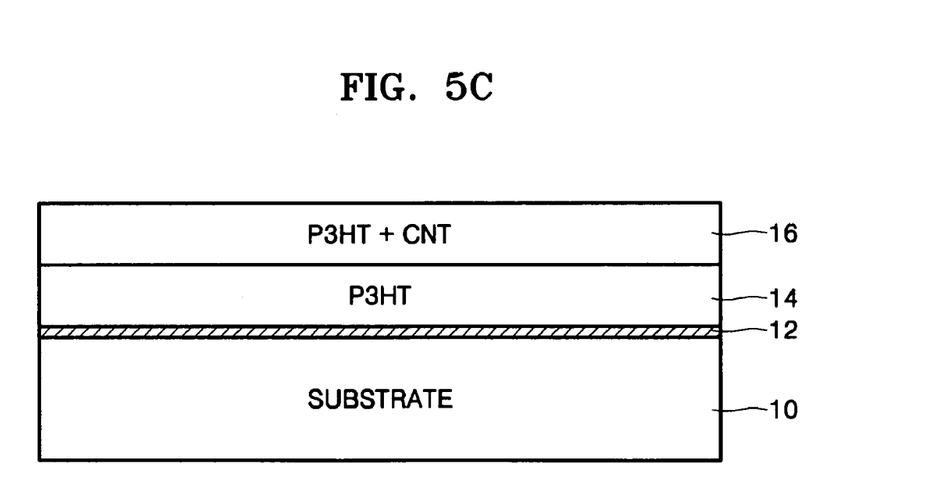

Referring to FIG. 5C, a second electron emission layer 16 formed of a composite made of carbon-based inorganic material and semiconductive polymer organic material is formed on the first electron emission layer 14. The carbon-based inorganic material can be material selected from the group consisting of $C_{60}$, $C_{70}$, $C_{76}$, $C_{78}$, $C_{84}$, and carbon nanotubes (CNTs).

To form the second electron emission layer 16, a semiconductive polymer organic material, such as P3HT, is mixed with chloroform ($CHCl_3$) to obtain a semiconductive polymer organic liquid. A mixed liquid of the semicoductive polymer organic material and carbon-based inorganic material, such as CNT, is then formed by mixing the semiconductive polymer organic liquid with carbon-based inorganic material. In one embodiment of the present invention, a mixed liquid made of 0.5 wt % of carbon-based inorganic material and 99.5 wt % of semiconductive polymer material can be formed. The mixed liquid is then coated on the first electron emission layer 14 using a spin coating method, a spray coating method, a deep coating method, or a screen printing method. The mixed coating layer made of the semiconductive polymer organic material and the carbon-based inorganic coating layer is then baked at a temperature of 120° C. for one hour. In this manner, the second electron emission layer 16 is formed.

Figure 5D:
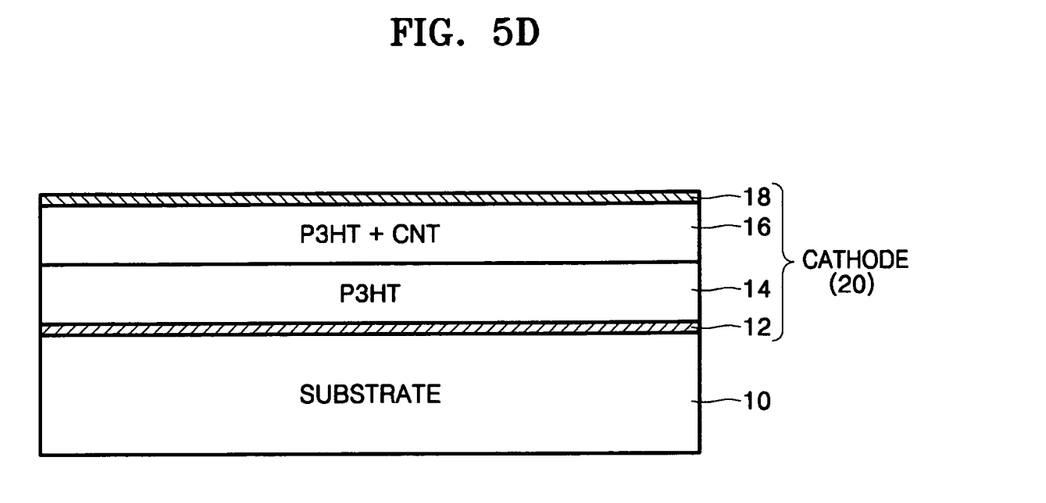

Referring to FIG. 5D, a second electrode layer 18 formed of a conductive material, such as Al, is formed on the second electron mission layer 16. To form the second electrode layer 18, one of various thin layer deposition methods such as CVD, PVD, screen printing, and spray coating can be used. Thus, a cathode unit 20 including the first electrode layer 12, the first electron emission layer 14, the second electron emission layer 16, and the second electrode layer 18 is formed.

Figure 5E:
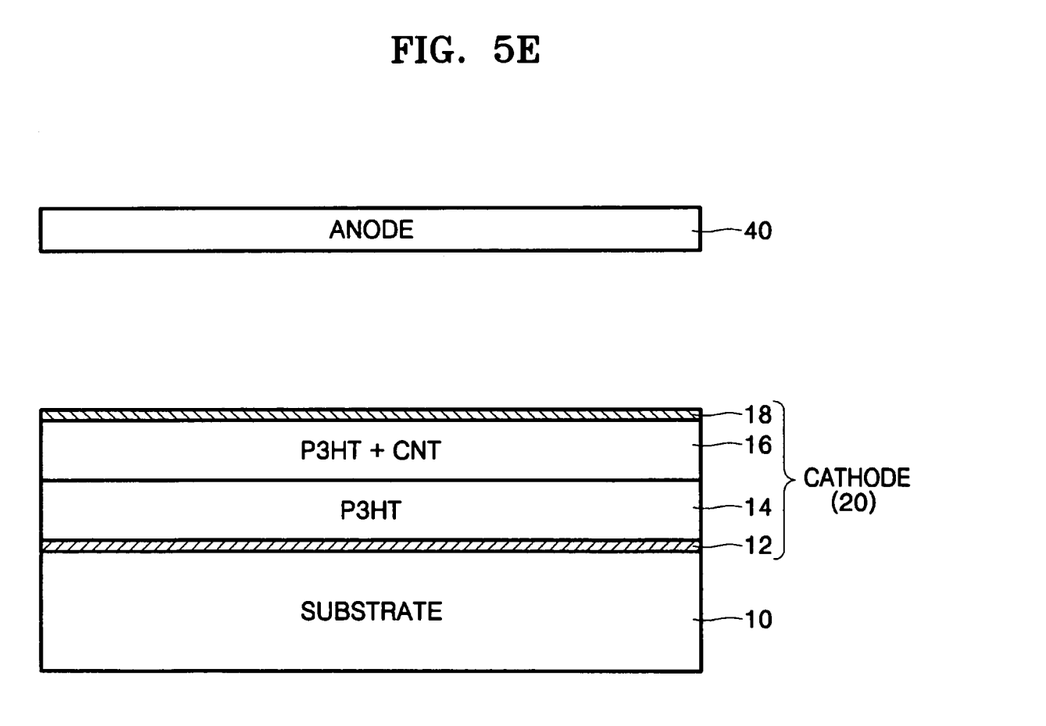

Referring to FIG. 5E, an anode is formed to face the cathode unit 20. A light source unit (not shown) can be further included on the rear surface of the light transmitting surface to radiate light with a wavelength between 400 nm and 900 nm onto the first and second electron emission layers 14 and 16. In this manner, a field emission device according an embodiment of the present invention can be manufactured.

According to the present invention, a field emission device with an improved structure in which electron emission from the cathode is enhanced by external light radiation is provided. In particular, since an electron emission layer made of a polymer material in an electron source of the field emission device is used, a flexible display for a large surface can be realized. Also, since sunlight can be used as an external light source in addition to a laser beam, the field emission device can have low power consumption.

Accordingly, new concept display devices such as portable or window-mountable devices corresponding to wall-mountable displays, such as PDPs and LCDs, can be developed based on the present invention.

While the present invention has been particularly shown and described with reference to exemplary embodiments thereof, it will be understood by those of ordinary skill in the art that various modifications in form and detail can be made therein without departing from the spirit and scope of the present invention as defined by the following claims.

What is claimed is:

1. A field emission device, comprising:
   a light transmitting substrate;
   a cathode unit arranged on the light transmitting substrate and adapted to emit electrons, the cathode unit including:
      a first electrode layer of a transparent conductive material arranged on the substrate;
      a first electron emission layer of a semiconductive polymer organic material arranged on the first electrode layer;
      a second electron emission layer of a composite of a carbon-based inorganic material and a semiconductive polymer organic material arranged on the first electron emission layer; and
      a second electrode layer of a conductive material arranged on the second electron emission layer; and
   an anode arranged to face the cathode unit.

2. The field emission device of claim 1, wherein the carbon-based inorganic material is selected from the group consisting of $C_{60}$, $C_{70}$, $C_{76}$, $C_{78}$, $C_{84}$, and carbon nanotubes (CNTs).

3. The field emission device of claim 1, wherein the semiconductive polymer organic material is selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

4. The field emission device of claim 1, wherein the second electron emission layer comprises 0.5 wt % of a carbon-based inorganic material and 99.5 wt % of a semiconductive polymer organic material.

5. The field emission device of claim 1, further comprising an external light source arranged on a rear surface of the light transmitting substrate and adapted to emit light with a wavelength in a range of 400 nm to 900 nm onto the first and second emission layers.

6. A field emission display device, comprising:
   a light transmitting rear substrate;
   a light transmitting front substrate arranged to face the light transmitting rear substrate;
   a cathode unit arranged on a surface of the rear substrate and adapted to emit electrons, the cathode unit including:
      a first electrode layer of a transparent conductive material arranged on the substrate;
      a first electron emission layer of a semiconductive polymer organic material arranged on the first electrode layer;
      a second electron emission layer of a composite of a carbon-based inorganic material and a semiconductive polymer organic material arranged on the first electron emission layer; and
      a second electrode layer of a conductive material arranged on the second electron emission layer; and
   an anode arranged on a surface of the front substrate to face the cathode unit; and
   a phosphor layer arranged on the anode.

7. The field emission display of claim 6, wherein the carbon-based inorganic material is selected from the group consisting of $C_{60}$, $C_{70}$, $C_{76}$, $C_{78}$, $C_{84}$, and carbon nanotubes (CNT).

8. The field emission display of claim 6, wherein the semiconductive polymer organic material is selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

9. The field emission display of claim 6, wherein the second electron emission layer comprises 0.5 wt % of a carbon-based inorganic material and 99.5 wt % of a semiconductive polymer organic material.

10. The field emission display of claim 6, further comprising an external light source arranged on a rear surface of the light transmitting rear substrate and adapted to emit light with a wavelength in a range of 400 nm to 900 nm onto the first and second emission layers.

11. A method of manufacturing a field emission device, comprising:
    providing a light transmitting substrate;
    forming a cathode unit on a surface of the substrate, the cathode unit adapted to emit electrons; and
    forming an anode facing the cathode unit such that the electrons are incident on the anode;
    wherein forming the cathode unit includes:
       forming a first electrode layer of a transparent conductive material on the light transmitting substrate;
       forming a first electron emission layer of a semiconductive polymer organic material on the first electrode layer;
       forming a second electron emission layer of a semiconductive polymer material and a carbon-based inorganic material layer on the first electron emission layer; and
       forming a second electrode layer of a conductive material on the second electron emission layer.

12. The method of claim 11, wherein the carbon-based inorganic material is selected from the group consisting of $C_{60}$, $C_{70}$, $C_{76}$, $C_{78}$, $C_{84}$, and carbon nanotubes (CNTs).

13. The method of claim 11, wherein the semiconductive polymer organic material is selected from the group consisting of poly 3-hexylthiophene (P3HT), poly 3-octylthiophene (P3OT), poly 3-methylthiophene (P3MT), poly bithiophene (PBT), poly p-phenylenevinylene (PPV), and thiophene-isothianaphthene-based copolymer (PDTI).

14. The method of claim 11, wherein the second electron emission layer comprises 0.5 wt % of a carbon-based inorganic material and 99.5 wt % of a semiconductive polymer organic material.

15. The method of claim 11, further comprising providing an external light source arranged on a rear surface of the light transmitting substrate and adapted to emit light with a wavelength in a range of 400 nm to 900 nm onto the first and second emission layers.

16. The method of claim 11, wherein forming the first electron emission layer comprises:
    forming a semiconductive polymer organic liquid by dissolving a semiconductive polymer organic material in chloroform ($CHCl_3$);
    coating the semiconductive polymer organic liquid on the first electrode layer; and
    baking the semiconductive polymer organic coating layer.

17. The method of claim 16, wherein the semiconductive polymer organic liquid is coated using one of a spin coating method, a spray coating method, a dip coating method, or a screen printing method.

18. The method of claim 16, wherein the baking process is conducted at a temperature of 120° C. for one hour.

19. The method of claim 11, wherein forming the second electron emission layer comprises:
    forming a semiconductive polymer organic liquid by dissolving a semiconductive polymer organic material in chloroform ($CHCl_3$);
    forming a mixed liquid by mixing the semiconductive polymer organic liquid with the carbon-based inorganic material;
    coating the mixed liquid on the first electron emission layer; and
    baking the mixed coating layer.

20. The method of claim 19, wherein the mixed liquid is coated using one of a spin coating method, a spray coating method, a dip coating method, or a screen printing method.

21. The method of claim 19, wherein the baking process is conducted at a temperature of 120° C. for one hour.

* * * * *